US006889243B1

(12) United States Patent
Hondou et al.

(10) Patent No.: US 6,889,243 B1
(45) Date of Patent: May 3, 2005

(54) JOB SCHEDULING ANALYSIS METHOD AND SYSTEM USING HISTORICAL JOB EXECUTION DATA

(75) Inventors: Yuri Hondou, Kawasaki (JP); Hirofumi Nagasuka, Kawasaki (JP); Tadashi Yamagishi, Yokohama (JP); Shunji Tanaka, Sagamihara (JP); Toshiyuki Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/249,765

(22) Filed: Feb. 16, 1999

Related U.S. Application Data

(63) Continuation of application No. 08/630,579, filed on Apr. 10, 1996, now Pat. No. 5,881,283.

(30) Foreign Application Priority Data

Apr. 13, 1995 (JP) .............................. 7-087966

(51) Int. Cl.[7] .............................. G06F 9/00
(52) U.S. Cl. .................. 709/100; 709/102; 709/106
(58) Field of Search ................... 709/100, 101, 709/102, 103, 104, 106, 105; 707/8

(56) References Cited

U.S. PATENT DOCUMENTS

| 4,495,562 A | 1/1985 | Yamaji et al. |
| 4,589,068 A | 5/1986 | Heinen |
| 4,920,484 A | 4/1990 | Ranade |
| 5,465,354 A | * 11/1995 | Hirosawa et al. ........... 709/106 |
| 5,524,242 A | * 6/1996 | Aida et al. .................. 717/149 |
| 5,634,120 A | 5/1997 | Nagasuka et al. |
| 5,642,508 A | 6/1997 | Miyazawa |

FOREIGN PATENT DOCUMENTS

| JP | 5-67069 | 3/1993 |
| JP | 6-83646 | 3/1994 |
| JP | 6-149597 | 5/1994 |

* cited by examiner

*Primary Examiner*—Majid A. Banankhah
(74) *Attorney, Agent, or Firm*—Mattingly, Stanger, Malur & Brundidge, P.C.

(57) ABSTRACT

A job scheduling analysis method and system are disclosed in which a job schedule is analyzed by use of historical job execution data in a computer system in which a plurality of jobs are executed in parallel. Historical execution data of a plurality of jobs and the file names of files accessed by the jobs are collected. The maximum multiplicity of jobs capable of operating in parallel on the computer system is inputted. When the file name of a file accessed by one job and the file name of a file accessed by another other job coincide with each other, an execution start condition of the plurality of jobs are determined to execute the one job and the other job at the earliest instants within the maximum job multiplicity so that the sequence of execution of processings by the one job and the other job is maintained and the execution time of the one job and the execution time of said other job do not overlap each other. Thereby, it is possible to simulate the influence of a change in system construction and to search for an effective batch processing with a reduced number of idle spaces.

6 Claims, 11 Drawing Sheets

JOB START RECORD — 115-1

| 01 | JOB NAME | JOB START DATE | JOB START INSTANT |
|---|---|---|---|

JOB STEP START RECORD — 115-2

| 02 | JOB STEP NAME | JOB STEP START DATE | JOB STEP START INSTANT | NAME OF JOB CONCERNED WITH GENERATION OF THIS RECORD |
|---|---|---|---|---|

FILE CLOSE RECORD — 115-3

| 03 | FILE NAME | FILE CLOSE DATE | FILE CLOSE INSTANT | NAME OF JOB STEP CONCERNED WITH GENERATION OF THIS RECORD | NAME OF JOB CONCERNED WITH GENERATION OF THIS RECORD |
|---|---|---|---|---|---|

JOB STEP END RECORD — 115-4

| 04 | JOB STEP NAME | JOB STEP END DATE | JOB STEP END INSTANT | NAME OF JOB CONCERNED WITH GENERATION OF THIS RECORD |
|---|---|---|---|---|

JOB END RECORD — 115-5

| 05 | JOB NAME | JOB END DATE | JOB END INSTANT | CPU USE TIME |
|---|---|---|---|---|

JOB INFORMATION CELL 201

| | |
|---|---|
| POINTER DESIGNATING NEXT JOB INFORMATION CELL | 301 |
| POINTER DESIGNATING FIRST JOB STEP INFORMATION CELL | 302 |
| JOB NAME | 303 |
| JOB START INSTANT | 304 |
| JOB END INSTANT | 305 |
| CPU USE TIME | 306 |

JOB SCHEDULING ANALYSIS METHOD AND SYSTEM USING HISTORICAL JOB EXECUTION DATA

This is a continuation application of U.S. Ser. No. 08/630,579, filed Apr. 10, 1996 now U.S. Pat. No. 5,881, 283.

BACKGROUND OF THE INVENTION

The present invention relates to a job scheduling analysis method in a computer system in which a plurality of jobs can operate in parallel, and more particularly to a job scheduling analysis method in which jobs are virtually executed supposing the transfer to a computer system which has a structural difference in job multiplicity, CPU performance, the number of CPUS or the like.

JP-A-5-67069, JP-A-6-83646 and JP-A-6-149597 have disclosed job scheduling, job simulation and job multiplicity control.

In the conventional on-line processing in a large-scale banking system or the conventional on-line processing for merchandise management in a physical distribution industry, a large number of works are performed in order to improve customer's services. The on-line processing is accompanied with a batch data processing for totaling data handled in those works. With the increase of the amount of data to be processed in the on-line processing and the variation of the kind of on-line services, there is a tendency that the amount of data to be processed in the batch processing is increased and the contents of batch processing are complicated.

In general, jobs for performing the on-line processing are called on-line jobs and jobs for performing the batch processing are called batch jobs. In order to cope with the increased number of works, there is a tendency to structure a computer system having a plurality of CPUS so that a batch work is performed by the system.

One technique for structuring such a computer system with plural CPUS includes a system in which a plurality of CPUS are operated by one operating system (OS) with one main,memory held in common. This system is called a tightly coupled multiprocessor system.

Another structuring technique includes a system in which a plurality of computers each having an independent CPU and main storage are coupled by a channel-to-channel coupling device. This system is called a loosely coupled multiprocessor system.

In the computer system based on each of the structuring techniques mentioned above, it is necessary to organize an efficient job schedule so that a batch processing is completed in a short time. Especially in the loose coupled multiprocessor system in which a plurality of independent OS's operate, it is necessary to perform a work with the OSeS cooperated.

In recent years, the batch processing is complicated with the variation of works and the increase of the amount of data, as mentioned above. For the purpose of shortening a job processing time, there can be considered a method in which the CPU performance of a computer is improved or a method in which the multiplicity of jobs is increased. But, the improvement of single CPU performance in the former method is nearing a limit in the present situation of the art. Therefore, it seems that the increase of job multiplicity in the latter method is sure to become indispensable for years ahead.

However, in order to realize the increase of a batch job multiplicity without destroying the correlation of complicated batch jobs, it is required that the efficiency of job scheduling should be improved. Otherwise, it is not possible to make efficient use of the computer resource of the multiprocessor system.

SUMMARY OF THE INVENTION

An object of the present invention is to provide a job scheduling analysis method in which the planning of a job schedule intended for the shortening of a job processing time can be supported on the basis of historical execution data (or temporal information of previous batch processing) before a batch processing is performed.

Another object of the present invention is to provide a Job scheduling analysis method in which in the case where there is a request for a change in job multiplicity or the like in the operational respect of system, the effect of the change can be evaluated through simulation based on historical execution data before the change is made.

A further object of the present invention is to provide a job scheduling analysis method in which in the case where jobs are distribute in a loosely coupled multiprocessor system, a computer for executing each job can be determined on the basis of historical data so that a plurality of files accessed by the distributed jobs can be arranged in a disk connected to one computer in the system in order to reduce the frequency of access to a disk connected to another computer in the system, thereby suppressing overhead concerning data transfer.

A still further object of the present invention is to provide a job scheduling analysis method and system in which a job scheduling plan formed on the basis of historical data can be cast in the execution start condition of a job executing system.

An on-line job has a time dependency whereas a batch job for performing a batch data processing has a property that it does not depend on the instant of time of start at which a fixed processing is performed for a predetermined input file. For a job having a configuration in which a plurality of such jobs are periodically repeated, it is possible to estimate the subsequent job execution on the basis of historical execution data. The shortening of an overall processing time for the job having such a property can be contemplated by forming a job scheduling plan before the job is executed. Also, the formation of such a job scheduling plan at the time of system design enables the contemplation of the plan of arrangement of files to disk devices or the like and a preliminary estimation of the job scheduling in the case where a change in system construction is made.

A job scheduling analysis method of the present invention for analyzing a job schedule by use of historical job execution data in a computer system in which a plurality of jobs are executed in parallel, comprises a step of collecting historical execution data of a plurality of executed jobs including the job name, execution start instant and execution end instant of each job, a step of collecting historical file access data including the file name and file close instant of each file accessed by the plurality of jobs during the operation thereof, the historical file access data being referred to from the plurality of jobs, a step of inputting the maximum multiplicity of jobs which can operate in parallel on the computer system, a step of comparing the file name of a file accessed by one job with the file name of a file accessed by another job, and a step of determining, when the file name of the file accessed by the one job coincides with the file name of the file accessed by the other job, an execution start condition of the plurality of jobs on the basis of the file close instant of each job in the historical file access data to execute the one job and the other job at the earliest instants within the maximum job multiplicity - - - so that the sequence of execution of processings by the one job and the other job is maintained and a job execution time of the one job from its execution start instant until its execution end instant and a job execution time of the other job from its execution start instant until its execution end instant do not overlap each other.

In the present invention, simulation is performed using historical execution data of each job operated on a computer system in which a plurality of jobs can operate in parallel and historical access data of a file subjected to input/output operation by each job during operation thereof. A step of determining an execution start condition of each job from the historical access data and a step of determining an execution time of each job from the historical execution data are provided considering that each batch job is logically executable if there has been generated a file to which the reference is to be made. There is also provided a step of performing simulation under a first condition that a job multiplicity in the computer system made the object of simulation is the maximum number of jobs which can operate in parallel and a second condition that the sequence of execution of jobs follows the execution start condition.

In the case where a change in system operation such as the increase or decrease of a job multiplicity is given as a parameter, the present invention makes it possible to perform the simulation by further providing a step of adding this parameter as a third condition.

In the present invention, a step of making a job grouping beforehand on the basis of the locality of files to be accessed may be provided before the simulation is performed.

According to the present invention, it is possible to determine a job execution start instant based on the present situation of job execution in such a manner that an execution start condition of each job is determined from collected historical access data and an execution time of each job is determined from historical execution data. A virtual job execution based on no job scheduler can be realized by a step of performing simulation under a first condition that a job multiplicity in the computer system made the object of simulation is the maximum number of jobs which can operate in parallel and a second condition that the sequence of execution of jobs follows the determined execution start condition. The result of simulation can provide a job schedule plan which has a shortened processing time.

In the case where a change in system operation such as the increase or decrease of a job multiplicity is given as a parameter, this parameter is added to the execution start condition, thereby making it possible to provide the result of job schedule in the case where the change in system operation was made. As a result, a system restructuring becomes possible with a prospect of solution of problems in the existing system.

By making a job grouping beforehand on the basis of files to be accessed before simulation is performed, it is possible to provide the resulting job schedule under a new condition given as a parameter. As a result, it is possible to provide a job schedule plan on a system such as a loosely coupled multiprocessor system which is different in construction from the existing system.

It is apparent from the above that according to the present invention, quantitative evaluation concerning a job scheduling can be obtained through static evaluation using the historical execution data with no need to perform a job monitoring by use of the restructured actual system, that is, without imposing a load on a system. Further, it becomes possible to reflect a job schedule in the existing system or to reflect the job schedule in the operation of jobs in a system based on a new parameter.

DESCRIPTION OF THE PREFERRED EMBODIMENTS

In the following, embodiments of the present invention will be explained in conjunction with a computer system including one or more computers each of which has one or more CPUS and a disk accessed from the CPU. In the case where the computer system includes a plurality of computers, each of the computers has means for making communication with the other computers.

In this computer system, a plurality of jobs are executed in parallel by a time sharing technique. The number of jobs executed in parallel has an upper limit designated for each computer. This upper limit is called a job multiplicity. A job is composed of one or more job steps. A job step corresponds to a programs which is executed in the corresponding job. A file subjected to an operation such as read, write, reference or the like is called an accessed file.

A batch job is logically executable if there has been generated a file to which the reference is to be made. Accordingly, in the case where a file to be accessed by a certain job is being accessed by another job, it is required that the execution of the job should not be started until after the execution of the already accessed job is completed. Namely, the start of execution of any given job has a restriction as to which job the given job should be started after. This restriction is called a scheduling condition.

Embodiments of the present invention will now be explained in detail by use of the accompanying drawings.

Figure 1:
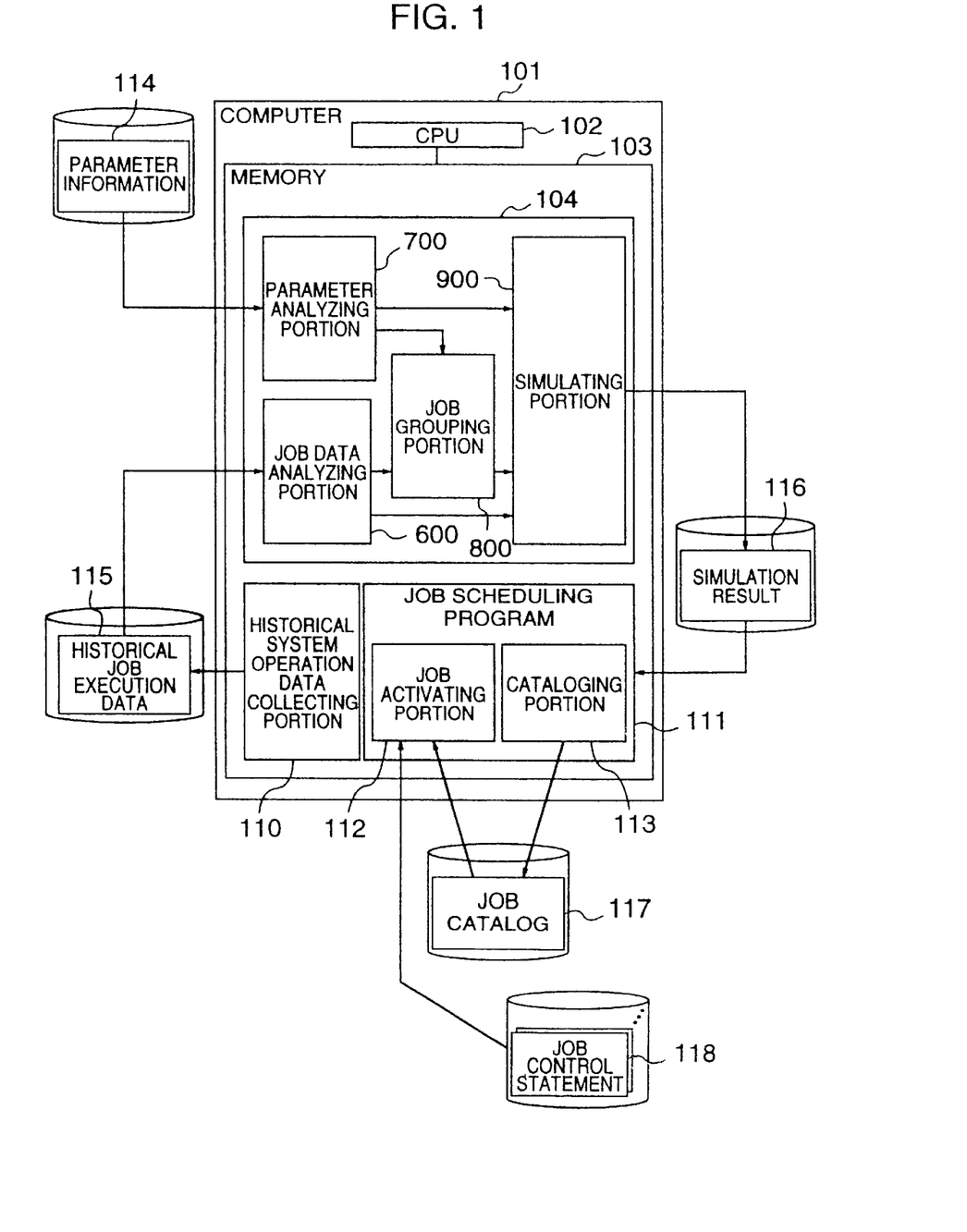
FIG. 1 is a block diagram showing the construction of an embodiment of a computer system provided with a job scheduling analysis portion 104 for realizing a job scheduling analysis method of the present invention.

FIG. 1 shows a basic system construction of an embodiment of the present invention. In the present embodiment, a computer 101 is composed of a CPU 102 and a memory 103. The memory 103 has a job scheduling analysis portion 104 for receiving parameter information 114 and historical job execution data 115 (which will be mentioned later on) to perform a job scheduling analysis, a historical system operation data collecting portion 110 for collecting historical system operation data (or temporal information obtained by executing batch jobs in the computer system), and a job scheduling program 111. The job scheduling program 111 includes a job activating portion 112 and a cataloging portion 113. Processing in the above-mentioned portions of the system are performed by the CPU 102.

Jobs inputted to the computer 101 are cataloged into a job catalog 117 by the cataloging portion 113 in the job scheduling program 111. On the basis of the thus produced job catalog 117, the job activating portion 112 activates the job into an executing state. For activation, it is required that each job should be prepared with a job control statement 118 describing which program is to be executed by a job to be activated and which file is to be accessed by the job to be activated. The job activating portion 112 activates a job on the basis of the job control statement 118 upon confirmation of whether or not a resource such as a file or the like necessary for executing the job is ensured.

The job is brought into an executing state through the above procedure. The situation of execution is collected by the historical system operation data collecting portion 110 to produce historical job execution data 115. An example of the construction of the historical job execution data 115 is shown in FIG. 2.

Figure 2:
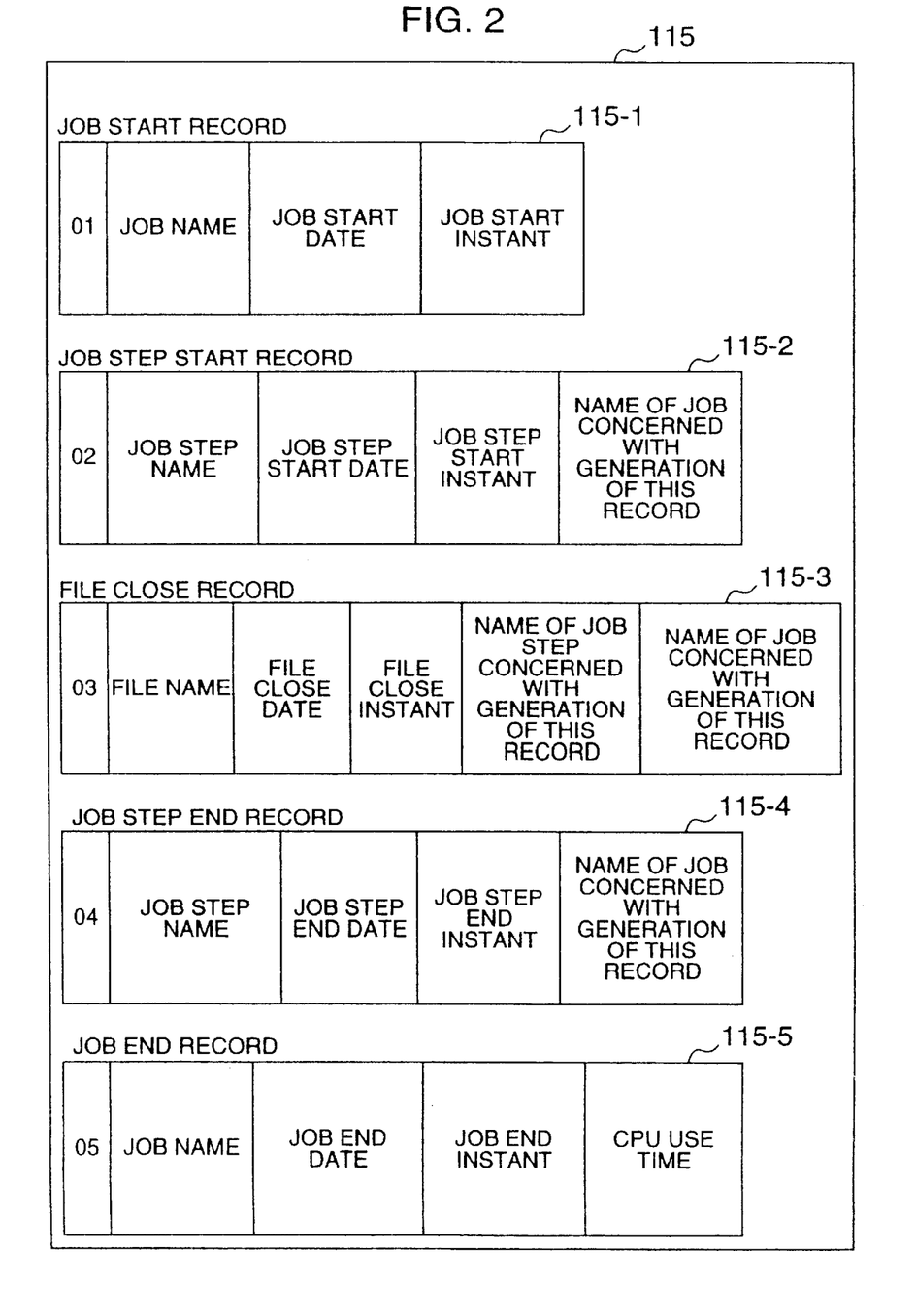
FIG. 2 is a diagram for explaining historical job execution data 115 which is information to be inputted in the present invention.

As shown in FIG. 2, the collected historical job execution data may include a job start record 115-1, a job step start record 115-2, a file close record 115-3 concerning an accessed file, a job step end record 115-4, a job end record 115-5, and so forth. Each of these records is generated by an event such as the start of execution of a job or the close of a file. The head or inner part of each record includes a record type representing the event that generates the record. In the present embodiment, the description of the record type defining the job start record as 01, the job step start record as 02, the file close record as 03, the job step end record as 04 and the job end record as 05 is provided at the head of each record.

Further detailed explanation will now be made of each record as the historical job execution data shown in FIG. 2.

The job start record 115-1 includes record type (01), job name, job start date and job start instant. The job step start record 115-2 includes record type (02), job step name, job step start date, job step start instant and name of a job concerned with the generation of this record. The file close record 115-3 concerning an accessed file includes record type (03), file name, file close date, file close instant, name of a job step concerned with the generation of this record and name of a job concerned with the generation of this record. The job step end record 115-4 includes record type (04), job step name, job step end date, job step end instant and name of a job concerned with the generation of this record. The job end record 115-5 includes record type (05), job name, job end date, job end instant and CPU use time.

Figure 3:
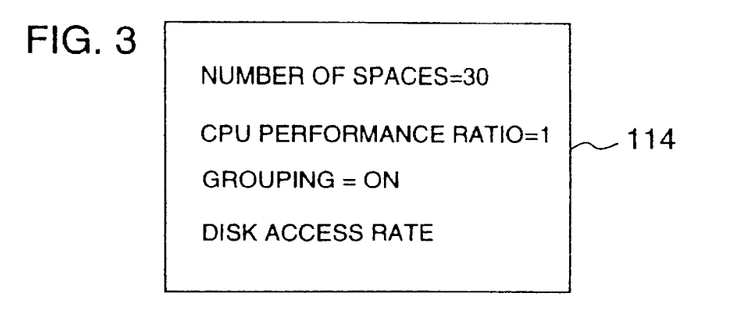
FIG. 3 is a diagram for explaining parameter information 114 which is information to be inputted in the present invention.

FIG. 3 shows the structure of the parameter information 114 which is inputted to the job scheduling analysis portion 104 together with the historical job execution data 115 shown in FIG. 2. The parameter information 114 is CPU processing information excepting the historical job execution data 115 which is data concerning jobs. The parameter information 114 includes information necessary for simulation which may include the number of spaces (or the maximum multiplicity of jobs which can be executed in parallel), a CPU performance ratio (or the improvement ratio of the performance of CPU in a new system), the designation concerning the output of simulation result, and so forth. FIG. 3 shows the case where the number of spaces is 30, the CPU performance ratio is 1 (or the CPU has the same performance) and a job grouping is designated to ON (or a grouping function is made available).

Next, the details of the job scheduling analysis portion 104 in the present embodiment will be explained.

As shown in FIG. 1, the job scheduling analysis portion 104 includes a job data analyzing portion 600 for analyzing the above-mentioned historical job execution data 115 (see FIG. 2), a parameter analyzing portion 700 for generating simulation condition defining information (114-1 in FIG. 5) necessary for simulation from the above-mentioned parameter information 114 (see FIG. 3), a job grouping portion 800 for making a job grouping for data generated by the job data analyzing portion 600, and a simulating portion 900 for simulating the situation of execution of jobs on the basis of input data from the job data analyzing portion 600, the parameter analyzing portion 700 and the job grouping portion 800. In the present embodiment, the job scheduling analysis portion 104 and the historical system operation data collecting portion 110 are provided in the same system. However, they may be provided in separate systems.

Figure 4:
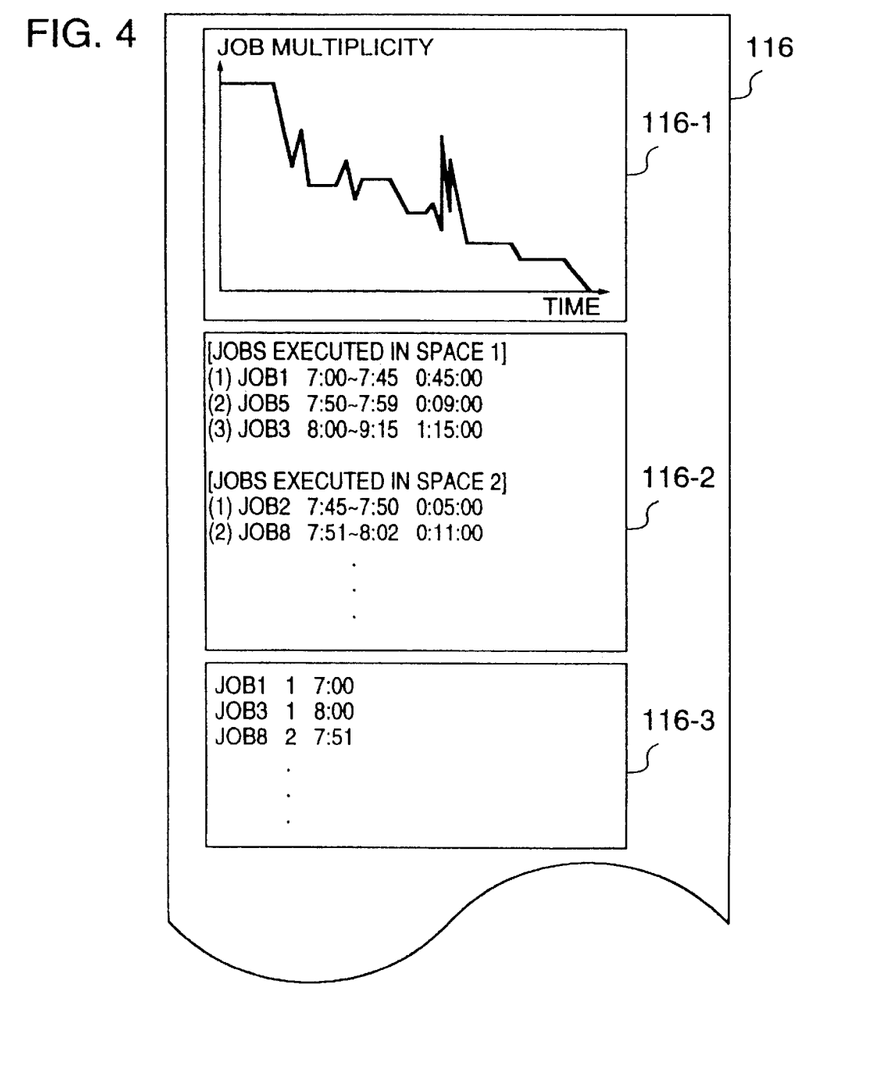
FIG. 4 is a diagram for explaining a simulation result 116 which is information to be outputted in the present invention.

The result of analysis by the simulating portion 900 is outputted as simulation result 116 by the simulation portion 900. The simulation result 116 is shown in FIG. 4. As shown in FIG. 4, the output information may include a temporal change or transition 116-1 of a job multiplicity after simulation, a list 116-2 of executed jobs, an input format 116-3 for the scheduling program 111, and so forth. The job multiplicity corresponds to the number of jobs simultaneously executed by one CPU in a time sharing manner. The executed job list 116-2 in FIG. 4 shows that jobs executed in a space 1 are JOB1, JOB5 and JOB3 and jobs executed in a space 2 are JOB2 and JOB8. It is further shown that, for example, JOB1, is executed from 7:00 to 7:45 and the execution time of JOB1 is 45 minutes. The executed job list may include a resource which is used for each job.

The input format 116-3 for the job scheduling program 111 is inputted to the job scheduling program 111 so that it is reflected in the job catalog 117. The shown input format 116-3 for the job scheduling program 111 includes an indicating statement which describes, for example, JOB1 as being executed in the space 1 from 7:00.

Figure 5:
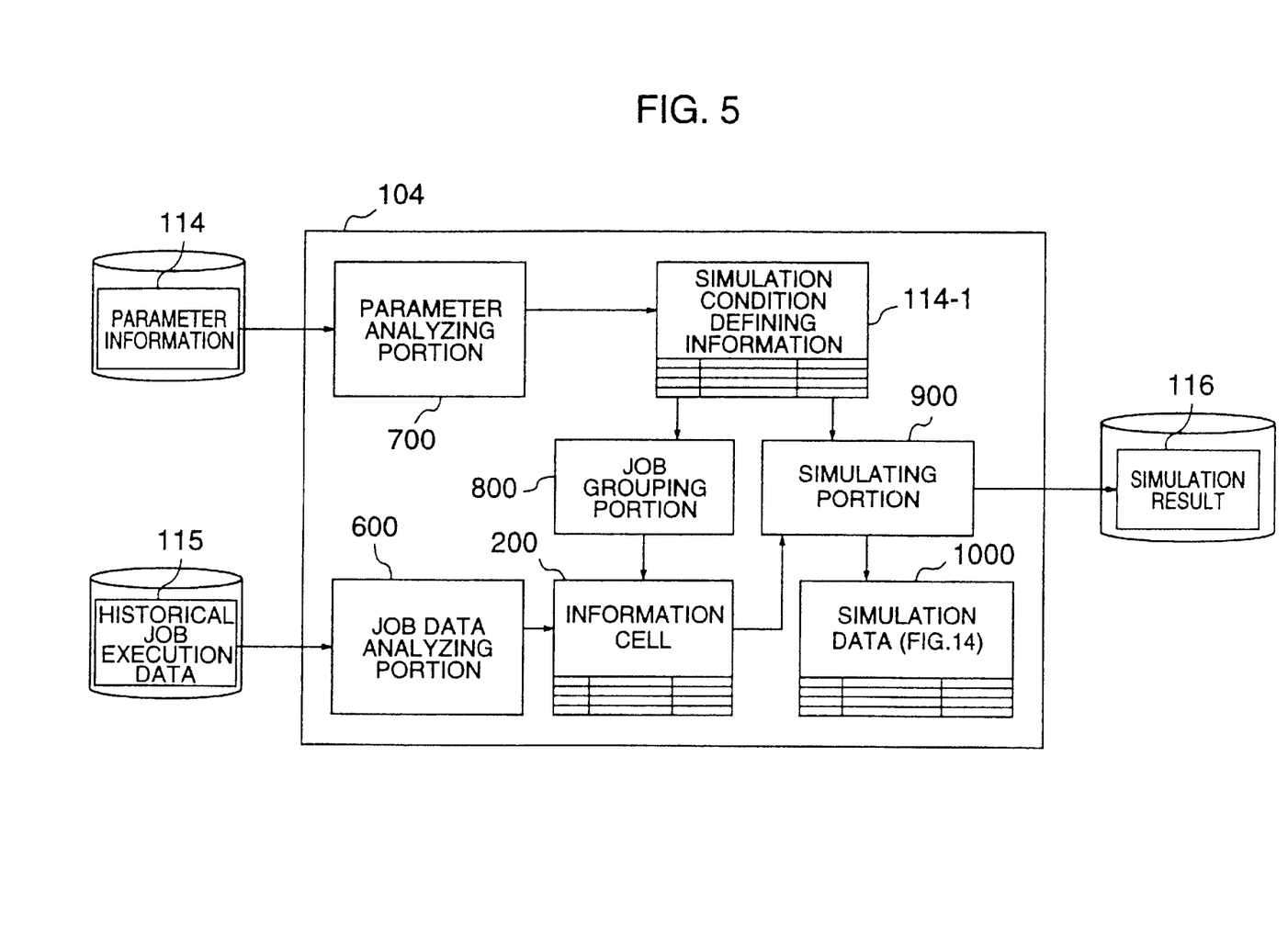
FIG. 5 is a diagram showing a specific example of the construction of the job scheduling analysis portion 104 in the present invention.

The details of the job scheduling analysis portion 104 are shown in FIG. 5. On the basis of the historical job execution data 115, the job data analyzing portion 600 generates information cells - - - each of which is the unit of information used for simulation.

Figure 6:
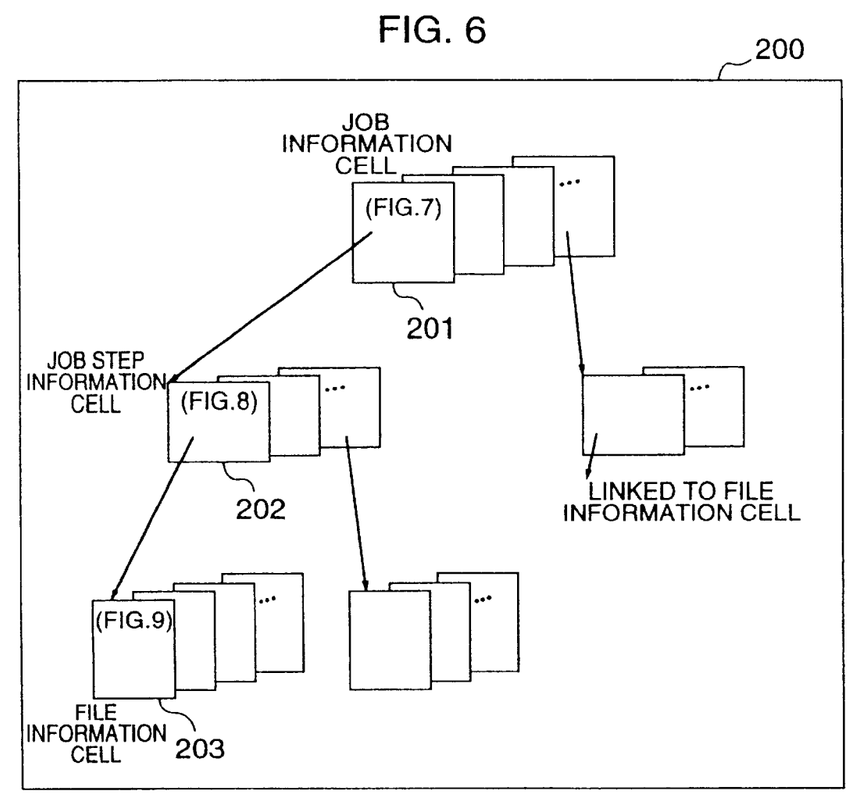
FIG. 6 is a diagram for explaining the construction of information cells which represent data concerning jobs and are used in the job scheduling analysis method of the present invention.

An example of the information cell construction is shown in FIG. 6. The information cells 200 are roughly classified into job information cells 201, job step information cells 202 and file information cells 203 in accordance with the kind of historical data included in the historical job execution data 115. The information cell 200 has a table structure with a related information cell being pointed by an element (or pointer) in the table structure so that the whole of information cells takes a list structure. The job information cell 201 designates a list of job step information cells 202 of job steps which form the corresponding job. The job step information cell 202 designates a file information cell 203 of a file which is accessed by the corresponding job step. A set of job information, job step information and file information cells 201, 202 and 203 represent information of the whole job.

Since the historical job execution data 115 include a plurality of jobs made the object of analysis, the job information cells 201 themselves take a list structure so that the next job information cell 201 is successively designated by a pointer.

Next, the detailed table structures of the above-mentioned information cells will be explained by use of FIGS. 7 to 9. Together with information for forming the list structure of information cells, information included in the historical execution data is stored in each information cell, as required.

Figure 7:
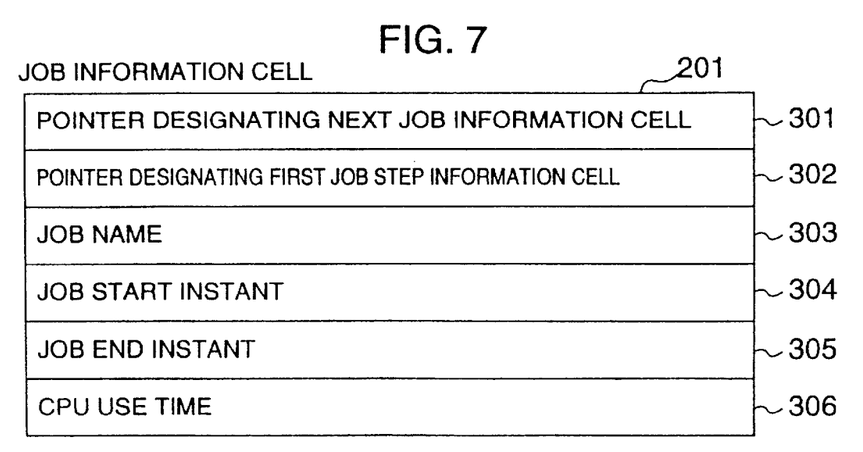
FIG. 7 is an explanatory diagram showing the table structure of a job information cell for storing data of a job.

FIG. 7 shows the table structure of the job information cell 201. In FIG. 7, a pointer 301 points the next element in the list of job information cells. A pointer 302 points the head of the list of information cells of job steps which form the corresponding job. Reference numeral 303 denotes a field for storing a job name for discriminating the corresponding job, numeral 304 a field for storing a job start instant, and numeral 305 a field for storing a job end instant. The information in these fields is used when an execution condition is determined by the simulating portion 900. Numeral 306 denotes a field for storing a total CPU use time for the corresponding job.

Figure 8:
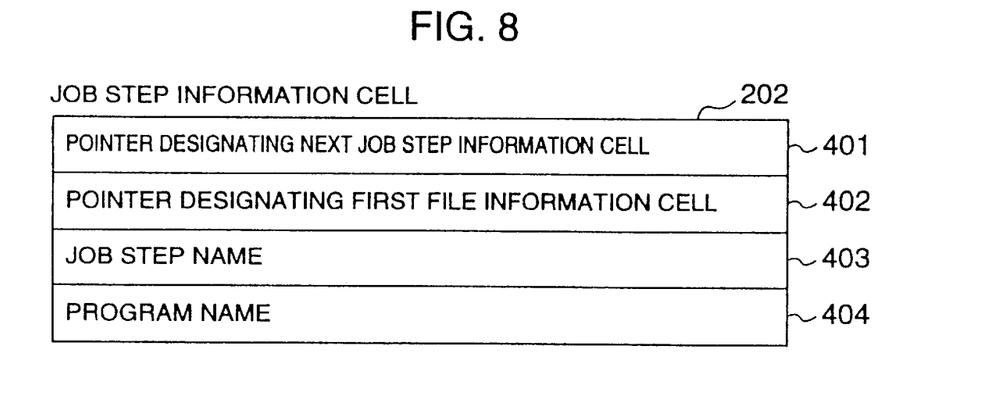
FIG. 8 is an explanatory diagram showing the table structure of a job step information cell for storing data of a job step.

FIG. 8 shows the table structure of the job step information cell 202. In FIG. 8, a pointer 401 points the next element (or the next job step information cell) in the list of job step information cells. A pointer 402 points the head of the list of information cells of files accessed by the corresponding job step. Reference numeral 403 denotes a field for storing a job step name for discriminating the corresponding job step, and numeral 404 denotes a field for storing the name of a program executed by the corresponding job step.

Figure 9:
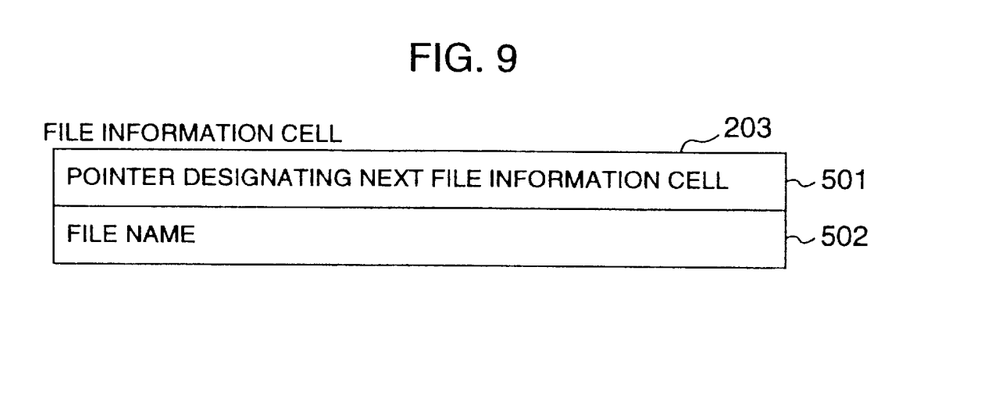
FIG. 9 is an explanatory diagram showing the table structure of a file information cell for storing data of an accessed file.

FIG. 9 shows the table structure of the file information cell 203. In FIG. 9, a pointer 501 points the next element (or the next file information cell) in the list of file information cells. Reference numeral 502 denotes a field for storing a file name for discriminating the corresponding file. This information is used when the execution condition is determined by the simulating portion 900.

Figure 10:
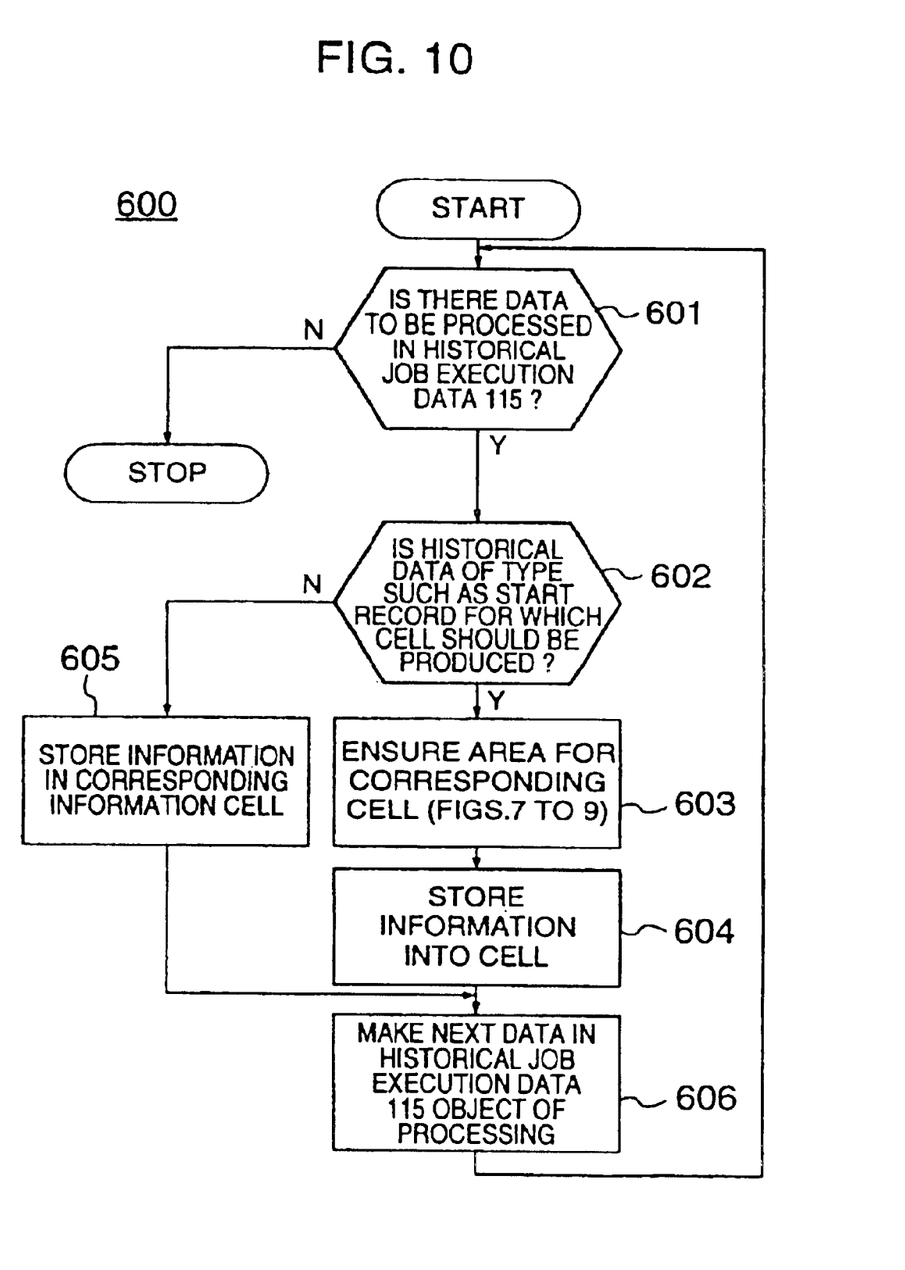
FIG. 10 is a flow chart for explaining a processing performed by a job data analyzing portion 600.

The detailed explanation of the flow of a processing performed by the job data analyzing portion 600 will now be made using a flow chart shown in FIG. 10.

In step 601, the leading data is read from historical job execution data 115 as shown in FIG. 2 so that processings in steps 602 to 606 are continued until the historical job execution data 115 runs out (or the job execution information file having the data 115 becomes empty).

In the case where the read record is such that no information cell for storing the contents of that record exists in an information cell list generated before the reading of that record (for example, as in the case of a job start record), it is necessary to newly generate an information cell for storing the contents of the record. Therefore, the judgement is made of whether or not the read data in the historical job execution data 115 is of a record type for which a new information cell should be produced (step 602).

In the case where the result of judgement in step 602 is true, the judgement of whether the corresponding record concerns job, job step or file is made on the basis of the contents of that record to ensure an area for an information cell having the corresponding type or format (step 603). The data is stored into the ensured information cell area while information for forming a list structure (for example, a pointer for the new information cell from the list) is set (step 604).

In the case where the result of judgement in step 602 is false, the data is stored into a corresponding information cell in the previously generated information cell list (step 605).

Thereafter, the flow returns to judgement step 601 with the next data in the historical job execution data 115 made the object of processing (step 606).

The parameter analyzing portion 700 analyzes parameter information 114 as shown in FIG. 3 to generate simulation condition defining information 114-1.

Figure 11:
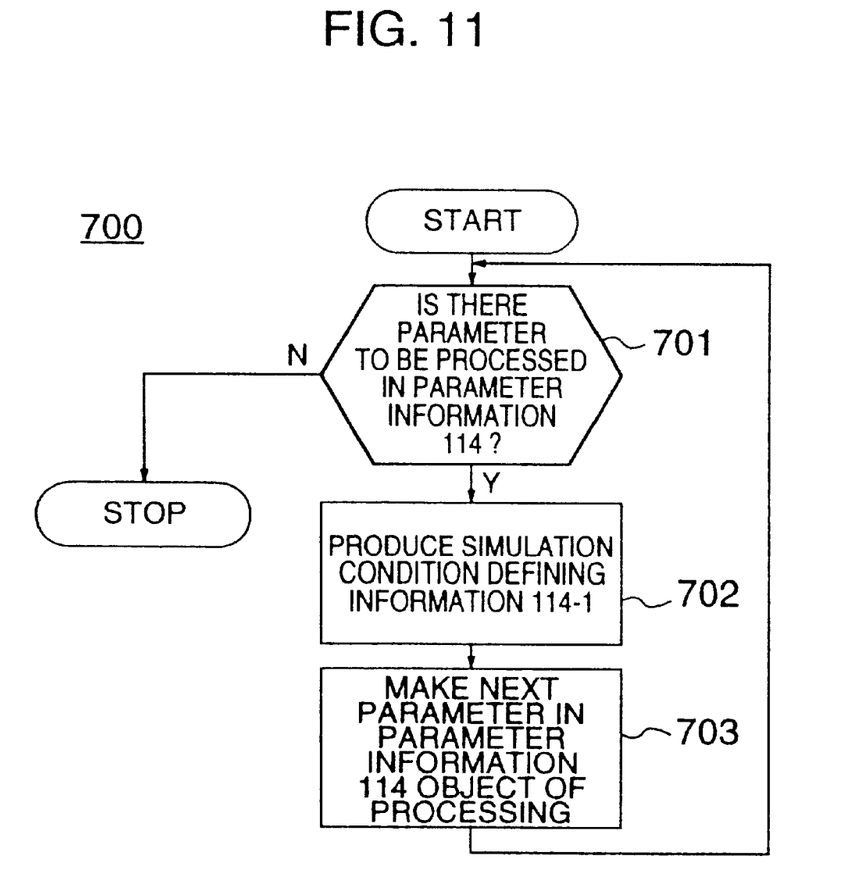
FIG. 11 is a flow chart for explaining a processing performed by a parameter analyzing portion 700.

The detailed explanation of a processing by the parameter analyzing portion 700 will now be made using a flow chart shown in FIG. 11.

In step 701, a parameter is read from the parameter information 114 so that processings in steps 702 to 703 are continued until parameters in the parameter information 114 run out (or the parameter information file having the information 114 becomes empty).

The judgement as to the type of the read parameter in the parameter information 114 is made so that the parameter is reflected in the simulation condition defining information 114-1 corresponding to the type of the parameter (step 702). For example, the multiplicity of executed jobs is read as the number of spaces from the parameter information 114 so that it is set into a corresponding item in the simulation condition defining information 114-1.

In order to continue the processing, the flow returns to judgement step 701 with the next parameter in the parameter information 114 made the object of processing (step 703).

The job grouping portion 800 is used in the case where it is desired to obtain the result of a job grouping aimed at the locality of file access in planning a change to a loosely coupled multiprocessor system. A plurality of groups of jobs are assigned to the respective processors and are executed in parallel. With a processing by the job grouping portion 800, the list of job information cells 201 is divided into a plurality of list groups each having the information cells of jobs in which files to be accessed overlap each other. The simulating portion 900 performs simulation in units of one job group generated by the job grouping portion 800, thereby making it possible to provide the result of a scheduling analysis using the job grouping in which the overlapping of files to be accessed is eliminated or made less.

Figure 12:
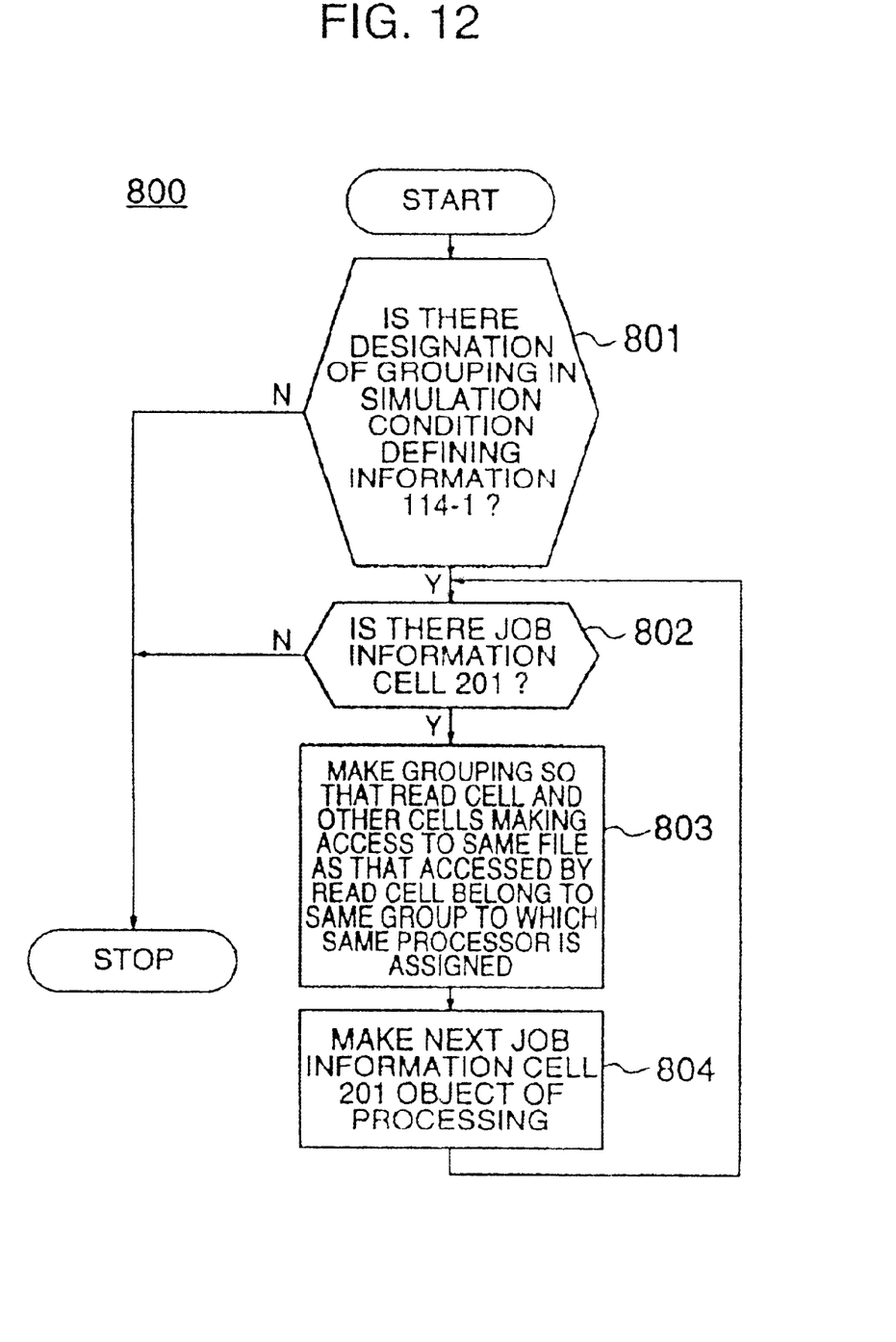
FIG. 12 is a flow chart for explaining a processing performed by a job grouping portion 800.

The detailed explanation of a processing by the job grouping portion 800 will now be made using a flow chart shown in FIG. 12.

In step 801, the reference is made to table data in the simulation condition defining information 114-1 (see FIGS. 3 and 5) designating whether or not a job grouping is to be made. In the case where the job grouping is to be made or there is the designation of the grouping to ON, processings in steps 802 to 804 are performed. On the other hand, in the case where there is no designation of the grouping to ON, the flow is completed with no processing performed.

In the case where there is the designation of the grouping to ON (step 801), a job information cell 201 is read to continue processings in steps 802 to 804 until the list of job information cells 201 becomes empty (step 802).

In step 803, the search of the list of job information cells 201 is successively made for jobs making access to the same file as that accessed by a job represented by the job information cell 201 read in step 802 to make a job grouping with the searched-out jobs being regarded as the same group. Jobs making access to the same file as that accessed by the jobs regarded as the same group are also regarded as belonging to the same group.

With the next job information cell 201 made the object of processing (step 804), the flow returns to step 802 to perform a similar processing again.

Next, the procedure of simulation of job execution by the simulating portion 900 will be explained in detail by use of FIGS. 13, 14 and 15.

Figure 13:
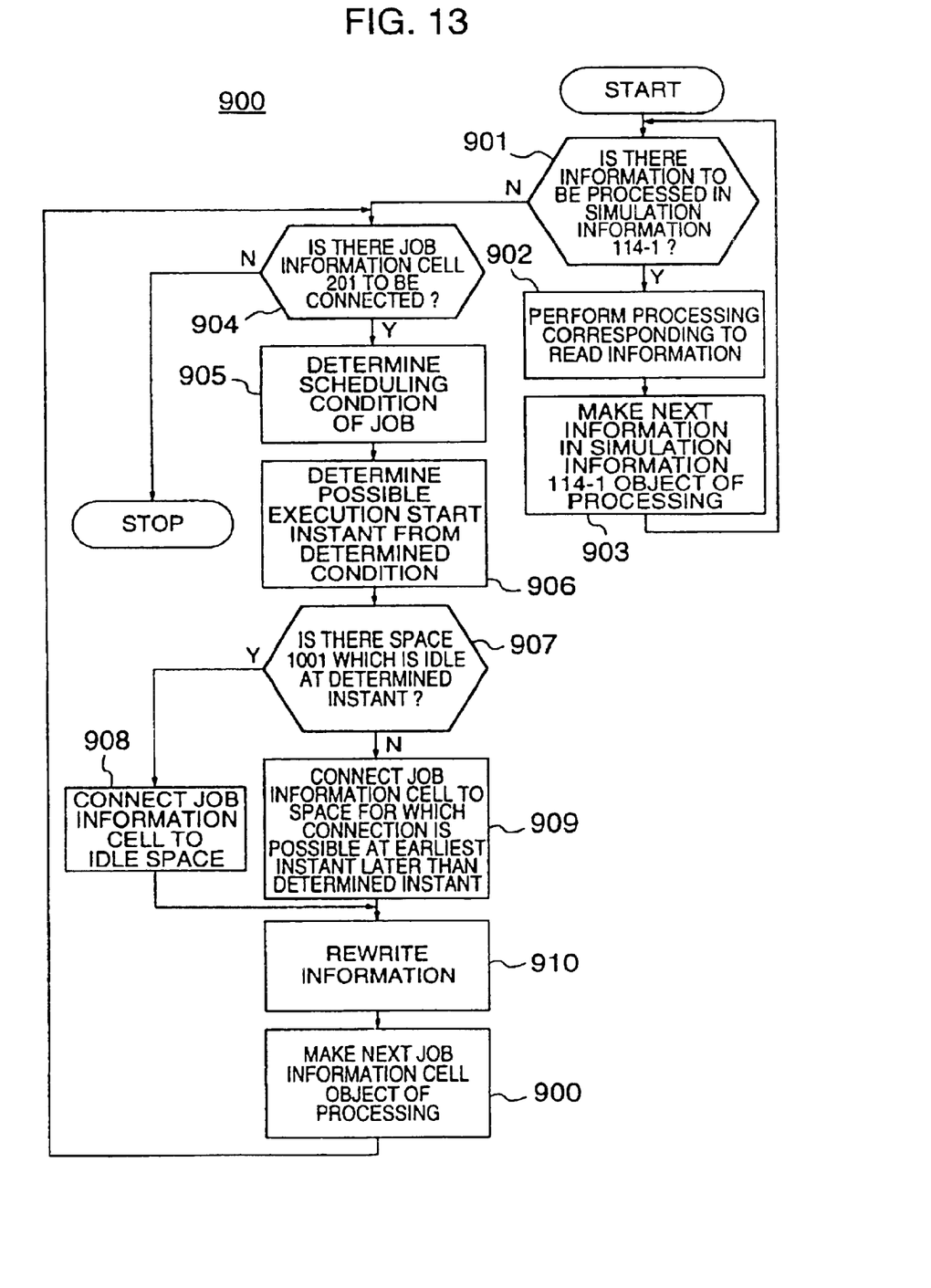
FIG. 13 is a flow chart for explaining a processing performed by a simulating portion 900.
Figure 14:
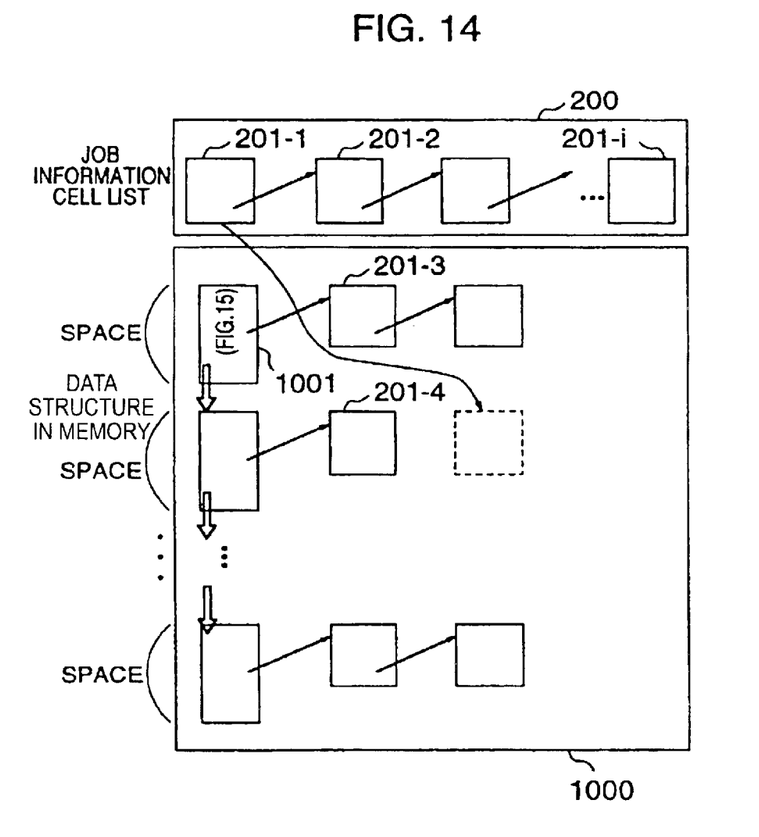
FIG. 14 is an explanatory diagram showing a data structure for representing the execution of jobs by simulation.

FIG. 13 shows a flow chart for explaining a processing performed by the simulating portion 900. FIG. 14 shows, as simulation data 1000, a schematic representation of the cell reconnection in the list of job information cells 201 (or the change in pointer relation in the list) which is performed in the flow shown in FIG. 13. In FIG. 14, symbols 201-$j$ (j 1 to i) represent a series of job information cells. An example of the table structure of a space 1001 in FIG. 14 is shown in FIG. 15.

Figure 15:
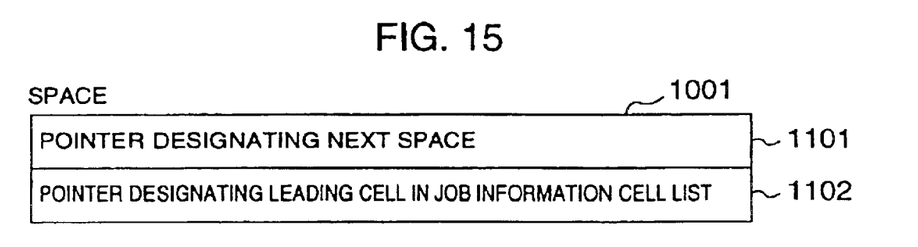
FIG. 15 is an explanatory diagram showing the table structure of a space 1001 used in the simulation.

In the table structure of the space 1001 shown in FIG. 15, a pointer 1101 is provided for pointing the next space 1001. This pointer relation is shown by a blank arrow in FIG. 14. Also, a pointer 1102 is provided for pointing the head of a list of job information cells which are connected to the corresponding space 1001. This pointer relation is shown by a solid arrow in FIG. 14.

The operation of the simulating portion 900 will now be explained in detail along the flow chart shown in FIG. 13.

In step 901, information is read from simulation condition defining information 114-1 as shown in FIG. 5 to perform processings in steps 902 to 903 until the simulation condition defining information 114-1 runs out. When the simulation condition defining information 114-1 runs out, the flow proceeds to step 904.

In step 902, there is performed a processing which corresponds to the read new simulation condition (see FIG. 3). For example, in the case where the simulation condition is a change in parameter of the number of spaces representing the maximum job multiplicity, spaces 1001 corresponding in number to the maximum job multiplicity are ensured in a memory area. Also, in the case where the simulation condition is a CPU performance ratio, the CPU use time 306 in the job information cell 201 shown in FIG. 7 is determined in accordance with the ratio (for example, in the form of time/ratio or in terms of ratio) and the job end instant 305 (see FIG. 7) is correspondingly rewritten.

In order to make successive extraction from the head of a list of job information cells 201 to be connected (200 see FIG. 14), the judgement is made of whether or not there are job information cells 201 to be connected (step 904). In the case where there are job information cells 201 to be connected, the cells 201 are extracted in due order from the head of the cell list to perform processings in steps 905 to 911 until the list becomes empty.

In step 905, the file close instant of a file accessed from a job of the extracted job information cell 201 is compared with those of the same file accessed from other jobs to determine a scheduling condition such as file acceptance for each job, that is, a condition that the time sequence of a plurality of jobs making access to the same file is maintained.

On the basis of the scheduling condition determined in step 905, a possible execution start instant is determined in accordance with the job end instants of the other jobs making access to the same file (step 906).

The contents of a list of job information cells having already been connected to the spaces 1001 before the possible execution start instant determined in step 906 are searched to make the judgement of whether or not there is a space which is idle at the determined possible execution start instant, that is, whether or not the job execution is possible at the determined possible execution start instant (step 907).

In the case where the step of judgement in step 907 is true (or the job execution is possible at the possible execution start instant determined in step 906), the job information cell is connected to the idle space 1001 to establish a pointer relation (step 908). At this time, the job information cell is connected to the space 1001 together with job step information cells designated (or pointed) by that job information cell.

In the case where the result of judgement in step 907 is false (or the job execution is not possible at the determined possible execution start instant determined in step 906), simulation is performed or the job information cell is connected to a space 1001 in which the job execution becomes possible at the earliest instant later than the possible execution start instant while maintaining the time sequence of a plurality of jobs making access to the same file (step 909).

After the connection of the job information cells is completed, data such as job execution time or the like in the job information cell is rewritten (step 910) and the flow returns to judgement step 904 with the next job information cell made the object of processing.

In the course of the processing by the simulating portion 900, there may be generated a time in which no job is executed. Such a time can be represented by a job information cell indicating the idleness. Thereby, it is possible to represent idle times in a job information cell list in the spaces 1001.

Next, specific explanation will be made of how job information cells are changed by steps 904 to 911 in the simulating portion 900. The explanation will be made referring to FIG. 14.

In judgement step 904, reference is made to a list 200 of unprocessed job information cells to be connected. In the case of the example shown in FIG. 14, cells 201-1, 201-2, —and 201-$i$ exist as the unprocessed job information cells and hence the result of judgement by step 904 is affirmative. Therefore, the cells 201-1, 201-2, —and 201-$i$ are extracted in due order from the head of the list 200 to perform processings in steps 905 to 911 for each cell.

In processing the job information cell 201-1 at the head of the list 200, the judgement is first made of which job in a job information cell list on a memory representing the result of simulation should the job information cell 201-1 be executed after (steps 905 to 908 or 909). The judgement is made on the basis of a close instant in the file close record of each job. In the example shown in FIG. 14, it is determined that the job information cell 201-1 should be executed after the job information cell 201-4. In this case, the job information cell 201-1 is reconnected to the rear of the job information cell 201-4 in step 908 or 909. At the same time, the job information cell 201-1 is eliminated from the unprocessed job information cell list 200.

As has been mentioned in the foregoing, the present embodiment makes it possible to represent the situation of job execution as a list of information cells on a memory and to perform simulation by use of parameter information and historical job execution data.

what is claimed is:

1. A job scheduling analysis method for analyzing a job schedule which should be executed in a second processor system, comprising:
   a step of inputting a historical job execution data of a first processor system in which a plurality of jobs are executed in parallel;
   a step of inputting an execution environment for said plurality of jobs which should be executed in a second processor system;
   a step of analyzing a job scheduling which should be executed in said second processor system based on said historical job execution data and said execution environment; and
   a step of outputting an execution start instant and an execution end instant for each of said plurality of jobs which should be executed in said second processor system based on a result of the analyzing step.

2. A job scheduling analysis method according to claim 1, wherein said execution environment includes a designated value of the maximum job multiplicity of jobs which can be executed in parallel on said second processor system.

3. A job scheduling analysis method according to claim 1, wherein said execution environment includes file access orders by said each of said plurality of jobs.

4. A job scheduling analysis system for analyzing a job schedule which should be executed in a second processor system, comprising:
   a CPU; and
   a memory;
   wherein said memory includes a job scheduling analysis program,
   wherein said CPU receives historical job execution data of a first processor system in which a plurality of jobs are executed in parallel, stores said historical job execution data in said memory, receives information of an execution environment for said plurality of jobs which should be executed in a second processor system, stores said information of execution environment in said memory, analyzes a job scheduling which should be executed in said second processor system based on said historical job execution data and said information of the execution environment by running said job scheduling analysis program, and outputs an execution start instant and an execution end instant for each of said plurality of jobs which should be executed in said second processor system based on a result of the analysis.

5. A job scheduling analysis system according to claim 4, wherein said information of the execution environment includes a designated value of a maximum number of jobs which can be executed in parallel on said second processor system.

6. A job scheduling analysis system according to claim 4, wherein said information of the execution environment includes file access orders by said each of said plurality of jobs.

* * * * *